May 9, 1939. A. A. MANNING 2,157,241
MACHINE TOOL
Filed March 9, 1937  5 Sheets-Sheet 2
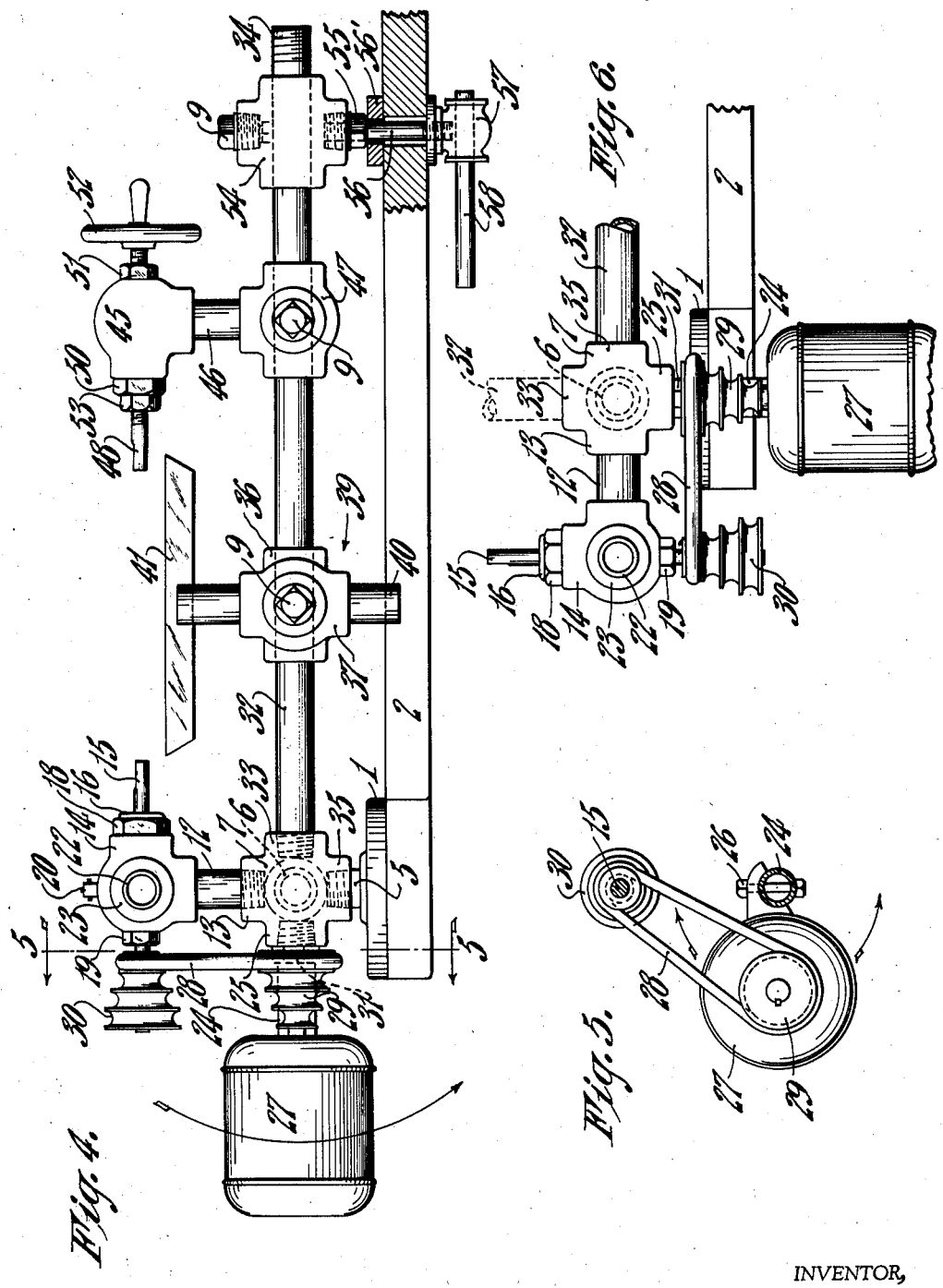
INVENTOR,
Axel A. Manning,
BY Blake Levens
ATTORNEY.

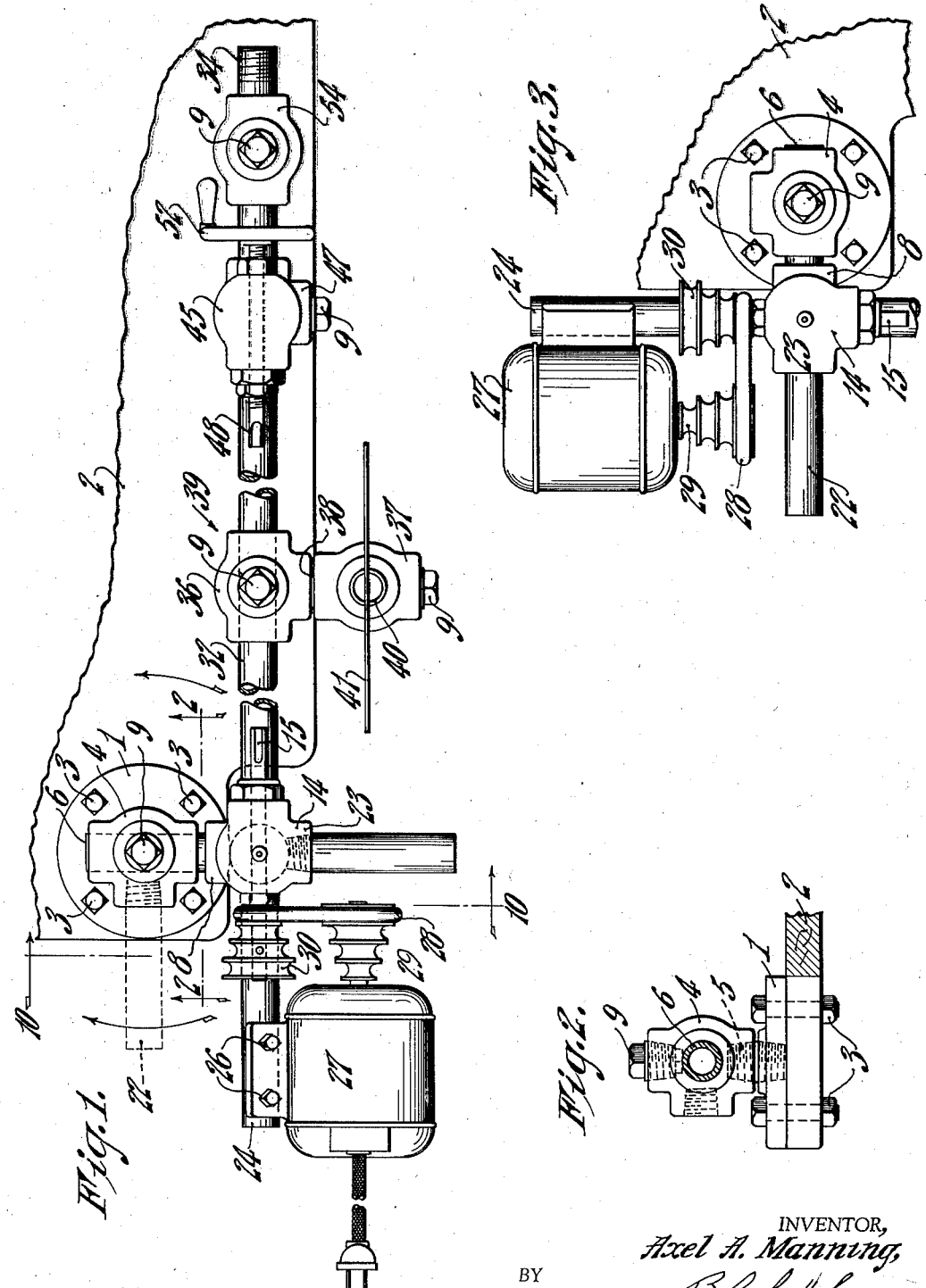

May 9, 1939. A. A. MANNING 2,157,241
MACHINE TOOL
Filed March 9, 1937 5 Sheets-Sheet 3
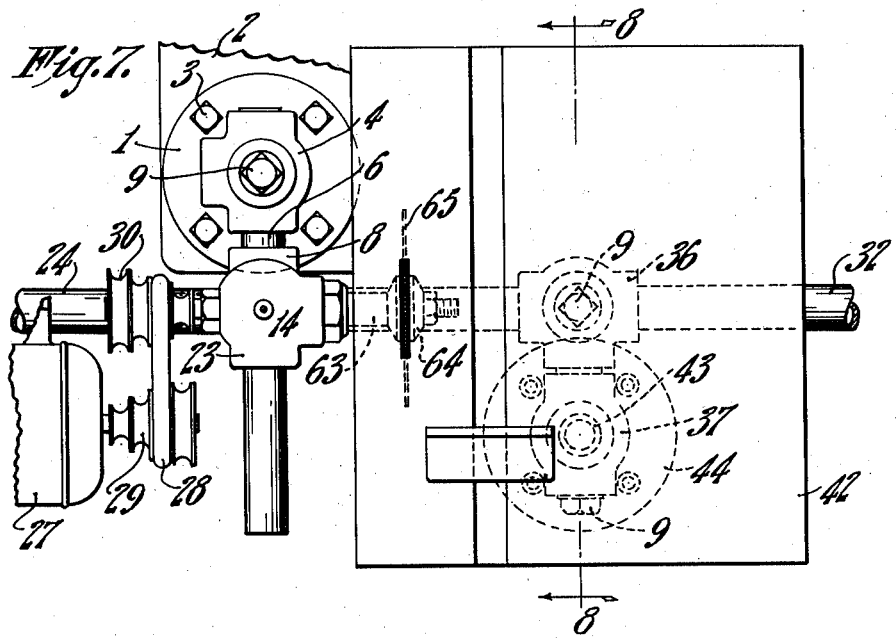
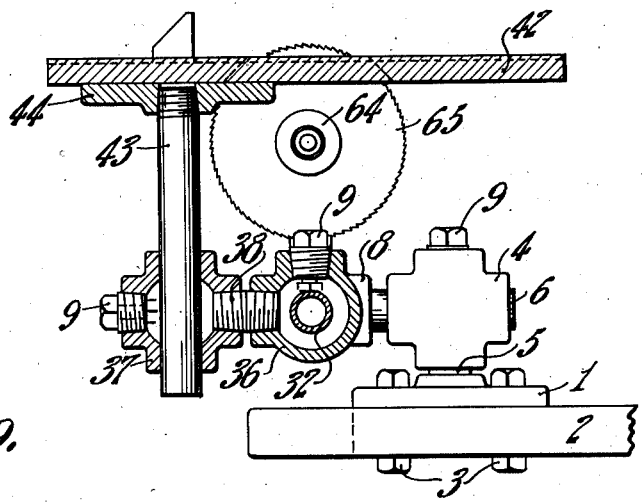
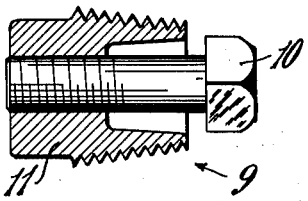
INVENTOR,
Axel A. Manning,
BY Blake A. Leaver
ATTORNEY.

May 9, 1939.  A. A. MANNING  2,157,241
MACHINE TOOL
Filed March 9, 1937  5 Sheets-Sheet 4
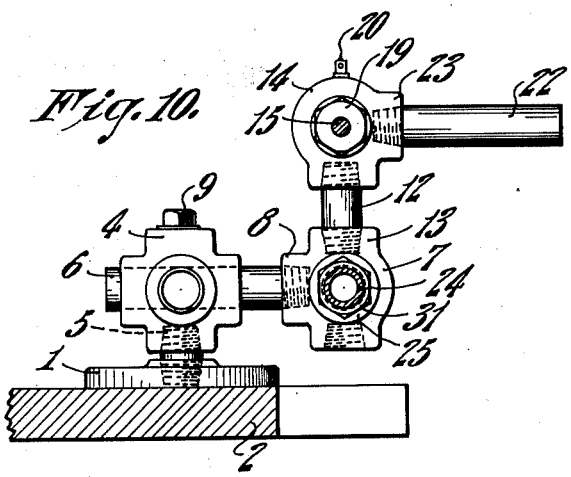
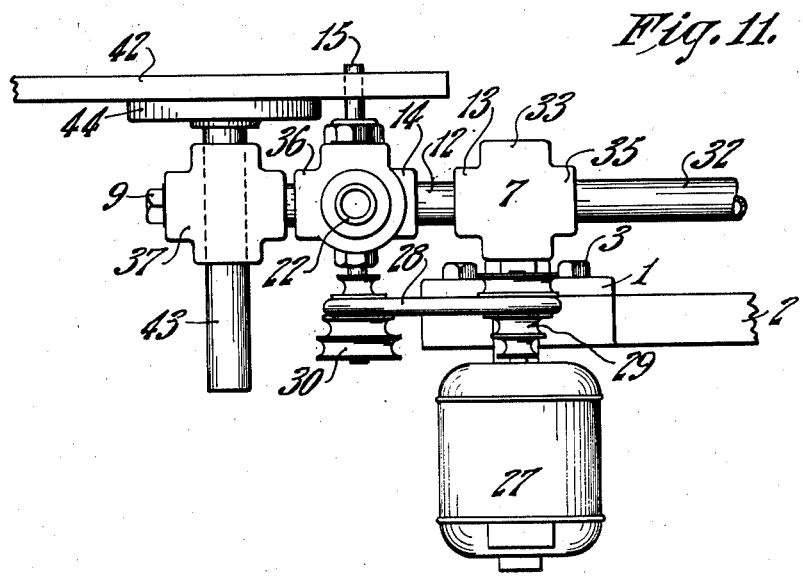
INVENTOR,
Axel A. Manning,
BY
ATTORNEY.

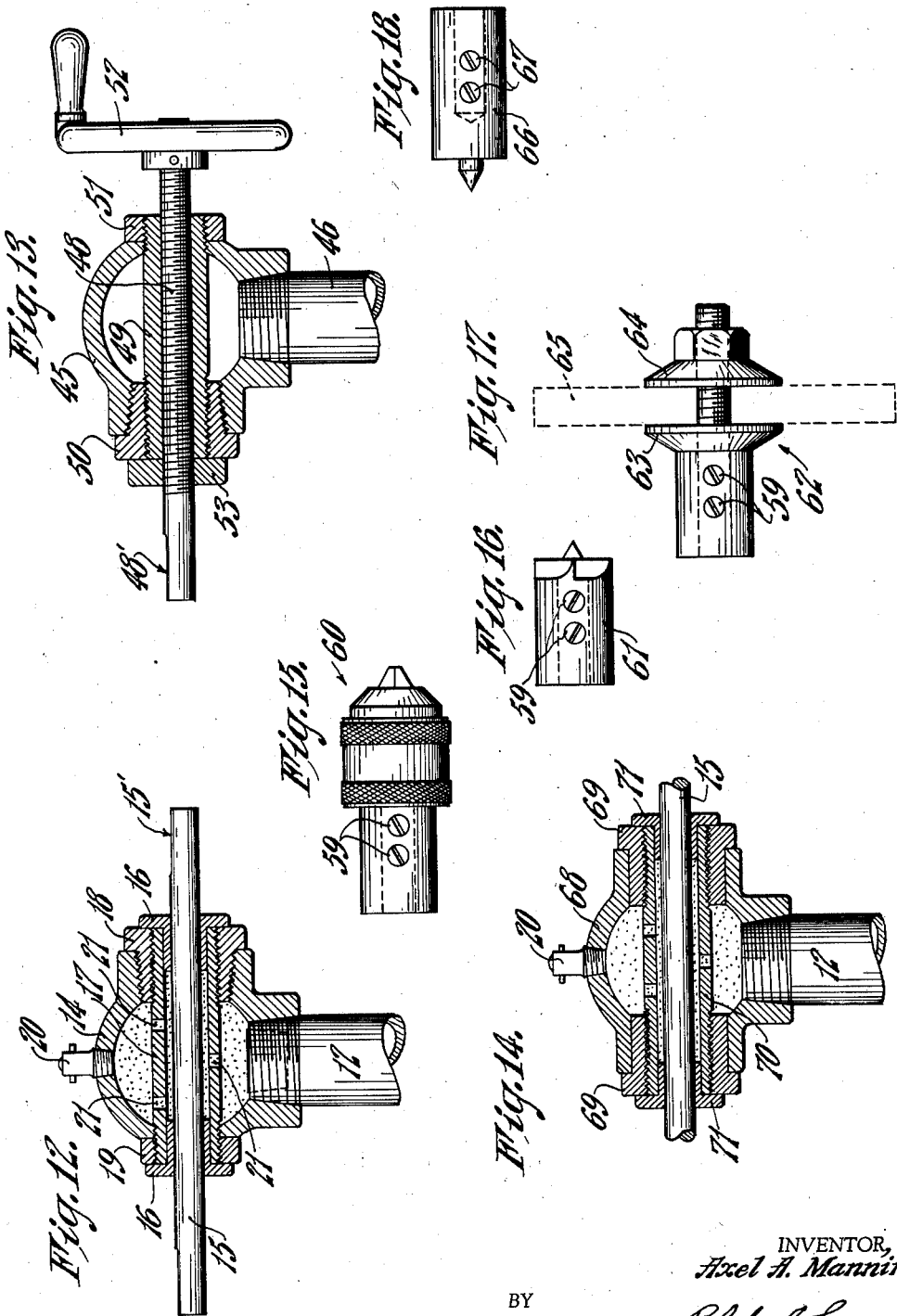

Patented May 9, 1939

2,157,241

UNITED STATES PATENT OFFICE 2,157,241

MACHINE TOOL

Axel A. Manning, Springfield, Mass.

Application March 9, 1937, Serial No. 129,884

11 Claims. (Cl. 29—27)

This invention relates to improvements in machine tools, and is particularly pertinent to that type of machine tool which is commonly termed in the trade a "home workshop".

An object of this invention is to provide a machine tool of light weight and extreme economy of construction, which will be easily adaptable to any of the uses which may be ordinarily required of a "home workshop".

Another object of this invention is to provide a machine tool construction which may be attached to any work bench or table, and which may be swung out of the way when it is desired to use the bench or table for other purposes.

A further object of this invention is to provide, in a machine tool construction, a removable driving head construction, whereby the driving head may be removed, and used as a portable tool, as desired. A still further object of this invention is to provide, in a machine tool construction including a lathe, means for easily and quickly aligning the axes of the live and dead centers.

These, and other objects and advantages of this invention will be more completely disclosed and described in the following specification, the accompanying drawings, and the appended claims.

Broadly, this invention comprises, in combination with a supporting bench or table, a pivot member secured on the bench, a block member pivotally supported in the pivot member for rotation about a vertical axis, a shaft removably supported in said block member and having a horizontal axis, a second block member rotatably supported on the shaft for rotation about the axis of the shaft, and a machine tool construction secured on said second block member, whereby the machine tool construction may be rotated about the vertical axis of the first block member and also about the horizontal axis of the shaft.

A preferred embodiment of this invention is illustrated in the accompanying drawings, in which—

Fig. 1 is a plan view of the machine tool assembled on the supporting bench as a lathe, Fig. 2 is a sectional view taken on the line 2—2 of Fig. 1, Fig. 3 is a partial plan view similar to Fig. 1, but showing the construction swung away from the bench, in a horizontal plane, Fig. 4 is a front elevational view of the construction as shown and positioned in Fig. 1, Fig. 5 is a sectional view taken on the line 5—5 of Fig. 4, Fig. 6 is a partial view similar to Fig. 4, but showing the construction swung upward into a vertical position, Fig. 7 is a plan view similar to Fig. 1 showing a table substituted for the tool rest shown in Fig. 1, Fig. 8 is a sectional view taken on the line 8—8 of Fig. 7, Fig. 9 is a detail sectional view of a lock nut, Fig. 10 is a sectional view taken on the line 10—10 of Fig. 1, Fig. 11 is a view similar to Fig. 6, showing the table and support mounted on the driving head as used for milling and similar operations.

Fig. 12 is a detail sectional view of the live center construction,

Fig. 13 is a detail sectional view of the dead center construction,

Fig. 14 is a detail sectional view of a modified form of live center construction, and Figs. 15–18 are elevational views of typical tools which may be used with the construction disclosed in previous views.

Referring now to the drawings in detail, in which like numerals refer to like parts throughout.

A pipe flange 1 is secured on a bench or table 2 by means of bolts 3, and a side outlet cross 4 is pivotally supported on the flange 1 by means of a short nipple 5. A shaft 6 is slidably and rotatably supported in the cross 4, which is reamed out to receive it, and a side outlet cross 7 is secured on the end of the shaft 6. The shaft 6 may be a length of pipe threaded into the side outlet 8 of the cross 7. The shaft 6 is held in adjusted position in the cross 4 by a locking screw 9. The locking screw 9 is made by tapping a standard cap screw 10 into a standard pipe plug 11, (see Fig. 9). A nipple 12, secured in a hub 13 of the cross 7, supports at its opposite end a side outlet L 14, and the L 14 is the driving or live center headstock for the machine tool construction. Referring now to the detailed construction of the head 14, as shown in Fig. 12, a shaft 15 is rotatably supported in bushings 16 which are pressed into opposite ends of a pipe or sleeve 17. The sleeve 17 is externally threaded at each end, and is secured in the head 14 by means of a pipe plug 18 and lock nut 19. A grease fitting 20 is tapped into the head 14, through which the head 14 may be filled with grease. Openings 21 in the sleeve 17 permit the grease to fill the interior of the sleeve 17 and thus lubricate the shaft 15 and bushings 16. A length of pipe 22 is secured in the side outlet 23 of the L 14, the purpose of which will be described in due course.

A length of pipe 24 is threaded into a hub 25 on the cross 7, and has secured thereon by means of bolts 26 an electric motor 27. A belt 28 connects a change speed pulley 29 on the motor 27 and a similar pulley 30 secured on the shaft 15. Tension on the belt 28 may be adjusted by revolving the shaft or pipe 24 in the hub 25, as indicated by arrows in Fig. 5. The shaft 24 is secured in adjusted position by a lock nut 31. This adjustability of the motor relative to the shaft 15 provides also for a very wide range in speed ratios between the motor 27 and shaft 15, as the pulley sizes may be varied at will, and the motor revolved on the axis of the pipe 24 to compensate for variation in the size and spacing of the pulleys.

A pipe 32 is threaded into a hub 33 of the cross 7 and serves as a bed member for the lathe construction illustrated in Figs. 1 and 4. The opposite end 34 of the bed 33 is also threaded to receive a coupling, (not shown), whereby the length of the bed may be increased by addition of another length of pipe. When the machine is tipped, as illustrated in Figs. 6 and 11, the bed 32 may, if desired, be unscrewed from the hub 33 and threaded into a hub 35 on the cross 7, thereby aiding in supporting and bracing the machine in the position indicated.

A tool rest or table support 39 is formed by combining a side outlet T 36, slidably supported on the bed 32 and locked in adjusted position with a locking screw 9, and a cross 37 secured in the T 36 by a nipple 38. A tool rest, comprising a pipe 40 with a blade 41 secured transversely in one end thereof, is slidably and adjustably secured in the cross 37 and held in adjusted position by a locking screw 9. For other purposes where a tool rest is not required, a table 42, provided with a downwardly projecting pipe 43 secured to the table 42 by means of a flange 44, may be substituted for the tool rest, by removing the tool rest from the cross 37 and inserting the pipe 43 in its place, as indicated in Figs. 7 and 8. In Fig. 11, the table 42 is shown supported on the driving head 14 by securing the T 36 of the tool support 39 on the pipe 22. For other purposes, the pipe 22 may be secured in the member 4, as indicated by dotted lines in Fig. 1, and either the tool rest 40 or table 42 supported thereon.

In the position indicated in Fig. 11, the construction may be used as a milling head, or work which has a greater radius than the distance from the shaft 15 to the bed 32, in Fig. 1, may be turned.

A tail stock or dead center head 45 is secured by means of a pipe nipple 46 in a side outlet T 47 which is slidably and adjustably supported on the bed 32 and secured in adjusted position by a locking screw 9, as indicated in Figs. 1 and 4. A screw 48, engaged in a sleeve 49 which is secured in the head 45 by means of a plug 50 and lock nut 51 and provided with a hand wheel 52, is locked in adjusted longitudinal position by a lock nut 53.

An important feature of this invention is the adjustability of the shaft 15 and screw 48, relative to their axes, whereby the axis of one may be readily aligned with the axis of the other. It is well known in the trade, that standard pipe fittings, with their more or less coarse threads, will generally have an eccentric effect in assembling, whereby the axis of the bore of the fitting is eccentric with the threaded bore or opening. The result of this condition in an assembly of pipe fittings such as that disclosed in this invention, would be to throw the axis of the shaft 15 out of alignment with the screw 48. This normal eccentricity of the pipe fittings in utilized for bringing the members 15 and 48 into axial alignment. By backing off the lock nuts 19 on the head 14 and 51 on the head 45, the plugs 18 and 50, respectively, may be revolved until the eccentricity inherent in the plugs aligns the members 15 and 48, in which position the sleeves 17 and 49 are locked by the lock nuts 19 and 51.

When the tool construction is used as indicated in Figs. 1 and 4, the bed 32 may be secured on the bench 2 at the opposite end from the flange 1 by means of the construction best illustrated in Fig. 4. A cross 54, slidably supported on the bed 32 and locked thereon by a locking screw 9, is fitted on the under side with a pipe plug 55, into which is removably threaded a rod 56 which extends downwardly therefrom, through a spacer 56' and the bench 2 and has secured on the bottom end thereof a T 57. A rod 58 may be inserted in the T 57 for turning the same and thereby unscrewing the rod 56 from the plug 55 when it is desired to release the bed 32 for movement about the shaft 6 or pivot 1.

A few typical examples of standard tools which may be used with the construction herein disclosed are illustrated in Figs. 15–18, inclusive. Fig. 15 shows a chuck 60 which may be secured on the shaft 15 by engagement of the screws 59 with the flat surface 15' formed on the shaft 15. Fig. 16 shows a live center 61 which may be removably secured on the shaft 15 in the same manner, and may be used for holding woodwork for turning or other operations. Fig. 17 illustrates a holding or clamping device 62 comprising a pair of opposed discs 63 and 64 for gripping a circular tool or device 65, such as a saw, grinding wheel, buffing wheel, or face plate. The member 63 may be secured on the shaft 15 in the same manner, being provided with screws 59. Fig. 18 illustrates a dead center 66 which may be secured on the shaft 48 by engagement of the screws 67 on a flat surface 48' formed on the shaft or screw 48.

A modified form of live center head is illustrated in Fig. 14. A cross 68 is secured on the nipple 12, and reamed out for a sliding fit for interiorly threaded plugs 69. The plugs are engaged on a sleeve 70, into the ends of which are pressed shaft bushings 71 which rotatably support the shaft 15. In either the head 14 or the head 68, the shaft 15 is secured against longitudinal movement by engagement of the pulley 30 against one of the bushings 16 or 71 cooperating with one of the tools 60, 61, or 62 engaged against the opposite bushing 16 or 71.

The adaptability of the construction disclosed, for all ordinary working purposes, should be apparent to one skilled in the art from the drawings accompanying this specification, which illustrate only a few typical examples. The construction disclosed includes a portable, self-contained, motor driven tool. This portable tool, which comprises the combination of the shaft 6, fitting 7, nipple 12, head 14 shaft 22 which may be used as a handle or grip, shaft 24 and motor 27 attached thereon, pulleys 29 and 30, and belt 28, is available by disconnecting the bed 32 from the fitting 7 and pulling the shaft 6 from the fitting 4.

The whole machine tool construction, with work and tools assembled thereon, may be swung away from the working space or top of the bench 2, either horizontally or vertically, or in a compound movement about the axes of the shaft 6 and pivot 1, so that the working top of the bench 2 becomes available for other work. The machine tool construction, with tools and work, is operable in any position which it may assume.

Typical examples of the adaptability of the construction disclosed may be suggested as follows: A lathe for either metal or wood turning; either vertical or horizontal drill; circular saw and table; sanding wheel and table; grinding wheel and table or tool rest; mortising; shaping; etc.

Either the tool rest 40 or the table 42 may be set at an angle to the normal position parallel to the axis of the fitting 36 by revolving the fitting 37 on the nipple 38.

Whereas I have shown a preferred embodiment of this invention as being constructed of standard pipe and fittings, I do not confine myself to this construction, as it will be readily understood by those skilled in the art, that other materials may be substituted without detracting from the efficiency of the construction as a whole.

What I claim is:

1. In a machine tool construction, a support, a member pivotally secured on said support for movement about a vertical axis, a shaft revolvably secured in said member for movement about a horizontal axis, a block secured on said shaft, a head stock supported on said block, a spindle in said headstock, a second shaft revolvably secured in said block, a motor secured on said second shaft, and operative connecting means between said motor and said spindle.

2. In a machine tool construction, a support, a member pivotally secured in said support for movement about a vertical axis, a shaft revolvably secured in said member for movement about a horizontal axis, a block secured on said shaft, a headstock supported on said block, a spindle in said headstock, a second shaft revolvably secured in said block, a motor supported on said second shaft, operable connecting means between said motor and said spindle, and a bed member secured in said block, whereby said block with the second shaft and motor, headstock and bed, may be pivoted as a unit about the vertical axis of said first named member and about the horizontal axis of said first named shaft.

3. In a machine tool construction, a block pivotally supported for rotary movement in both vertical and horizontal planes, a headstock supported on said block, a shaft revolvably supported on said block, a motor secured on said shaft, operative connecting means between the motor and the headstock, a cylindrical bed secured in said block, a member slidably and rotatably supported on said bed, and a tool rest pivotally supported in said member for rotary movement about an axis perpendicular to the axis of said bed.

4. In a machine tool construction, a bench, a block pivotally supported on said bench for rotary movement in both vertical and horizontal planes, a headstock supported on said block, a shaft revolvably supported on said block, a motor secured on said shaft, operative connecting means between said motor and said headstock, a cylindrical bed secured on said block, a tailstock slidably and revolvably supported on said bed, a clamping device slidably secured on said bed for clamping said bed on said bench, means for disconnecting said clamping device from said bench, a member slidably and rotatably supported on said bed, a holder member for a tool rest or table pivotally supported on said first named member.

5. In a machine tool construction, a bed member, means for pivotally supporting said bed member for both horizontal and vertical pivotal movement, a head stock secured on said bed member, a stationary shaft secured in said head stock, a tool rest or table supporting member slidably, removably, and rotatably supported on said bed member, whereby said tool rest or table supporting member may be removed from said bed member and placed on said shaft.

6. In a machine tool construction having a cylindrical supporting member, a member slidably and rotatably supported on said supporting member, means for adjustably locking said member on said supporting member, a second member pivotally secured on said first member for movement about an axis perpendicular to the axis of the supporting member, and means for adjustably securing a fixture, as a tool rest or table, in said second member.

7. In a machine tool, a headstock and tailstock construction, comprising a casing, an eccentric bushing revolvably secured in said casing, a sleeve secured at one end in said casing and at the opposite end in said bushing, and a spindle revolvably supported in said sleeve, whereby the axis of the spindle may be varied relative to the axis of the casing by revolution of said bushing.

8. In a lathe construction, a headstock comprising a pipe L, a pipe plug threadably secured in a hub of said L, a pipe threadably secured in said L and said plug, and a spindle revolvably supported in said pipe.

9. In a machine tool construction, a headstock comprising a pipe T, pipe plugs secured in opposing hubs of said T, a pipe sleeve threadably secured in said plugs, and a spindle rotatably supported in said sleeve.

10. In a machine tool construction, a bench, a flange secured on said bench, a pipe cross pivotally supported on said flange, a shaft slidably and rotatably supported in said cross, a second pipe cross secured on said shaft, a headstock supported on said second cross, a spindle rotatably secured in said headstock, a bed member secured in said second cross, a fixture support slidably and rotatably supported on said bed member, a tailstock slidably and rotatably supported on said bed member, a second shaft rotatably supported on said second cross, a motor secured on said second shaft, operative connecting means between said motor and said second shaft, whereby said second cross and the members supported thereon may be pivoted about the axis of said first named shaft and also about the axis of said flange.

11. In a machine tool construction, a support, a block pivotally mounted on said support for rotary movement about both vertical and horizontal axes, a headstock secured on said block, a spindle rotatably supported in said headstock, a shaft revolvably supported in said block, a motor secured on said shaft, operative connecting means between said motor and said spindle, a fixed shaft secured in said headstock, a member slidably and rotatably supported on said fixed shaft, a second member pivotally secured in said first named member, and a fixture, as a tool rest or work table, slidably and adjustably supported in said second member.

AXEL A. MANNING.